United States Patent
Shi et al.

(10) Patent No.: US 11,693,704 B2
(45) Date of Patent: *Jul. 4, 2023

(54) RESOURCE LOADING AND A SERVICE FUNCTION FOR A SOFTWARE APPLICATION

(71) Applicant: Advanced New Technologies Co., Ltd., Grand Cayman (KY)

(72) Inventors: Danxia Shi, Hangzhou (CN); Weigang Guan, Hangzhou (CN); Wenhong Chen, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 22 days.

This patent is subject to a terminal disclaimer.

(21) Appl. No.: 17/466,136

(22) Filed: Sep. 3, 2021

(65) Prior Publication Data

US 2022/0058061 A1    Feb. 24, 2022

Related U.S. Application Data

(63) Continuation of application No. 16/723,063, filed on Dec. 20, 2019, now Pat. No. 11,132,232, which is a
(Continued)

(30) Foreign Application Priority Data

Mar. 7, 2016  (CN) .......................... 201610127837.1

(51) Int. Cl.
*G06F 9/50* (2006.01)
*G06F 9/445* (2018.01)
(Continued)

(52) U.S. Cl.
CPC ........ *G06F 9/5027* (2013.01); *G06F 9/44505* (2013.01); *G06F 9/44521* (2013.01); *G06F 16/9574* (2019.01); *H04L 65/40* (2013.01)

(58) Field of Classification Search
CPC ............... G06F 9/5027; G06F 9/44505; G06F 9/44521; G06F 16/9574; H04L 29/08; H04L 65/40
See application file for complete search history.

(56) References Cited

U.S. PATENT DOCUMENTS 10,990,265 B2    4/2021   Rathod
2003/0208472 A1  11/2003  Pham et al.
(Continued)

FOREIGN PATENT DOCUMENTS

CN    102663003    9/2012
CN    103475744    12/2013
(Continued)

OTHER PUBLICATIONS

Appcrafty [online], "Embedding one App inside another," Oct. 25, 2011, retrieved on May 14, 2021, <https://www.youtubecom/watch?v=kaCk6QuBdHg>, 1 pages [Video Submission].
(Continued)

*Primary Examiner* — Wissam Rashid
(74) *Attorney, Agent, or Firm* — Fish & Richardson P.C.

(57) ABSTRACT

A foundation framework resource of a first service function is loaded in a software application. A service request for starting the first service function in the software application is received. A page resource required by the first service function is loaded. The first service function is implemented based on the foundation framework resource of the first service function and the page resource.

14 Claims, 8 Drawing Sheets

Related U.S. Application Data continuation of application No. 16/123,948, filed on Sep. 6, 2018, now Pat. No. 11,249,806, which is a continuation of application No. PCT/CN2017/074320, filed on Feb. 21, 2017.

(51) Int. Cl.
*G06F 16/957* (2019.01)
*H04L 65/40* (2022.01)

(56) References Cited

U.S. PATENT DOCUMENTS

| | | | |
|---|---|---|---|
| 2005/0257204 | A1 | 11/2005 | Bryant et al. |
| 2006/0265481 | A1 | 11/2006 | Seitz et al. |
| 2011/0197160 | A1 | 8/2011 | Kim et al. |
| 2013/0205385 | A1 | 8/2013 | Roesner et al. |
| 2014/0207851 | A1 | 7/2014 | Qu |
| 2015/0040103 | A1 | 2/2015 | Nyisztor et al. |
| 2015/0089352 | A1* | 3/2015 | Conboy .............. G06F 16/9574 715/234 |
| 2015/0278171 | A1 | 10/2015 | Lefebvre et al. |
| 2018/0365071 | A1 | 12/2018 | Shi et al. |
| 2019/0213019 | A1 | 7/2019 | Hu et al. |
| 2020/0125414 | A1 | 4/2020 | Shi et al. |
| 2020/0142573 | A1 | 5/2020 | Rathod |

FOREIGN PATENT DOCUMENTS

| | | |
|---|---|---|
| CN | 103530160 | 1/2014 |
| CN | 103645925 | 3/2014 |
| CN | 105224363 | 1/2016 |
| TW | 201502476 | 1/2015 |
| WO | WO 2012172743 | 12/2012 |
| WO | WO 2014176744 | 11/2014 |

OTHER PUBLICATIONS

Bez, devangelist.de [online], "React Javascript Framework," Jan. 2016, retrieved on Sep. 23, 2019, retrieved from URL<http://devangelist.de/en/react-js/>, 13 pages.

Crosby et al., "BlockChain Technology: Beyond Bitcoin," Sutardja Center for Entrepreneurship & Technology Technical Report, Oct. 16, 2015, 35 pages.

Extended European Search Report in European Application No. 17762438.4, dated Sep. 23, 2019, 10 pages.

International Preliminary Report on Patentability in International Application No. PCT/CN2017/074320 dated Sep. 11, 2018; 8 pages.

International Search Report by the International Searching Authority issued in International Application No. PCT/CN2017/074320 dated May 11, 2017; 8 pages.

Nakamoto, "Bitcoin: A Peer-to-Peer Electronic Cash System," www.bitcoin.org, 2005, 9 pages.

Roesner et al., "User-Driven Access Control: Rethinking Permission Granting in Modern Operating Systems," 33rd IEEE Symposium on Security and Privacy, Jul. 2012, 15 pages.

Takeshi Morita, "In smartFX Apache Cordova About utilization," Dec. 2014, retrieved on Aug. 19, 2021, retrieved from URL<https://files.speakerdeck.com/presentations/b512db105c510132ac7d5e7f6e542783/smartfx_cordova.pdf, 56 pages (with machine translation).

* cited by examiner

RESOURCE LOADING AND A SERVICE FUNCTION FOR A SOFTWARE APPLICATION

CROSS-REFERENCE TO RELATED APPLICATIONS

This application is a continuation of and claims the benefit of priority of U.S. patent application Ser. No. 16/723,063, filed on Dec. 20, 2019, which is a continuation of and claims the benefit of priority of U.S. patent application Ser. No. 16/123,948, filed on Sep. 6, 2018, which is a continuation of PCT Application No. PCT/CN2017/074320, filed on Feb. 21, 2017, which claims priority to Chinese Patent Application No. 201610127837.1, filed on Mar. 7, 2016, and each application is hereby incorporated by reference in its entirety.

TECHNICAL FIELD

The present application relates to the field of computer technologies, and in particular, to a resource loading method and a service function implementing method and device for an application (APP).

BACKGROUND

With the rapid development of computer technologies, numerous applications (APPs) have emerged, and users can process a variety of services by using the APPs. In actual applications, an APP can further divide a service corresponding to the APP into a plurality of sub-services, so that the APP usually includes a plurality of service functions. Users can complete corresponding sub-services of the APP by using the service functions. For example, an APP for instant messaging usually includes sub-services for adding friends and voice chats. Therefore, such type of APP usually includes a service function for adding friends and a service function for voice chats to implement the corresponding sub-services.

In current technology, when an APP is running, and a user needs to start a certain service function, a service function can be triggered (for example, using a start button). A terminal device (or an operating system) running the APP can load, at a back end, a plurality of service resources needed for starting the service function, and start the service function based on a service resource loading result.

Although the previously described resource loading method is relatively common, it can satisfy actual needs in some scenarios where requirements on real-time performance are low. However, in current technology, starting the service function can require many service resources, which can require a long time for a terminal device (or the operating system) to complete a loading process after the user triggers the service function to start (for example, using a start button). As a user experience can be negatively affected.

SUMMARY

Implementations of the present application provide a resource loading method and a service function implementing method and device for an application (APP) to resolve the following problem in current technology: A starting a service function needs many service resources, which can result in a long starting time after a user triggers the service function to start.

An implementation of the present application provides a resource loading method for an APP, and the method includes the following:

The implementation of the present application provides a resource loading method for the APP, where resources of the APP include a foundation framework resource and a page resource, and the method includes the following: loading a foundation framework resource of a first service function in the APP before receiving a service request for starting the first service function in the APP, where the foundation framework resource of the first service function is used to provide a running environment for implementing the first service function; and after receiving the service request for starting the first service function, loading a page resource that the first service function needs.

Preferably, after loading the page resource that the first service function needs, the method further includes loading a foundation framework resource of a second service function in the APP before receiving a service request for starting the second service function.

Preferably, an engine of the APP is a hybrid engine; and in this case, loading the foundation framework resource of the first service function in the APP includes loading a foundation framework REACT of the first service function in the APP by using the hybrid engine.

An implementation of the present application further provides a service function implementing method for an APP, and the method includes the following: receiving a service request for starting a first service function in the APP; loading, based on the service request, a page resource needed for implementing the first service function; and implementing the first service function based on a foundation framework resource of the first service function and the page resource, where the foundation framework resource of the first service function is loaded based on the resource loading method for an APP provided in the implementation of the present application or any preferred solution of the method before the service request is received.

An implementation of the present application further provides a resource loading device for an APP, where resources of the APP include a foundation framework resource and a page resource, and the device includes a foundation framework resource loading unit and a page resource loading unit; the foundation framework resource loading unit is configured to load a foundation framework resource of a first service function in the APP before a service request for starting the first service function in the APP is received, where the foundation framework resource of the first service function is used to provide a running environment for implementing the first service function; and the page resource loading unit is configured to load, after the service request for starting the first service function is received, a page resource that the first service function needs.

Preferably, the device further includes a second foundation framework resource loading unit, configured to load a foundation framework resource of a second service function in the APP before a service request for starting the second service function is received.

Preferably, the foundation framework resource loading unit includes a foundation framework resource loading subunit, configured to load a foundation framework REACT of the first service function in the APP by using a hybrid engine when an engine of the APP is the hybrid engine.

An implementation of the present application further provides a service function implementing device for an APP, where the device includes a receiving unit, a loading unit, and an implementation unit. The receiving unit is configured to receive a service request for starting a first service function in the APP; the loading unit is configured to load, based on the service request, a page resource needed for implementing the first service function; and the implementation unit is configured to implement the first service function based on a foundation framework resource of the first service function and the page resource, where the foundation framework resource of the first service function is loaded based on the resource loading device for an APP provided in the implementation of the present application or any preferred solution of the device, before the service request is received.

At least one of the previously described technical solutions adopted in the implementations of the present application can achieve the following beneficial effects:

The foundation framework resource of the first service function in the APP is loaded before the service request for starting the first service function in the APP is received. Therefore, after the service request is received, service resources that need to be loaded are reduced, and starting the first service function takes a shorter time. As such, the following problem in current technology is resolved: After a user triggers a start button of a first service function, starting the first service function needs to take a long time because many service resources need to be loaded. In addition, the user experience is improved.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF EMBODIMENTS

Figure 1:
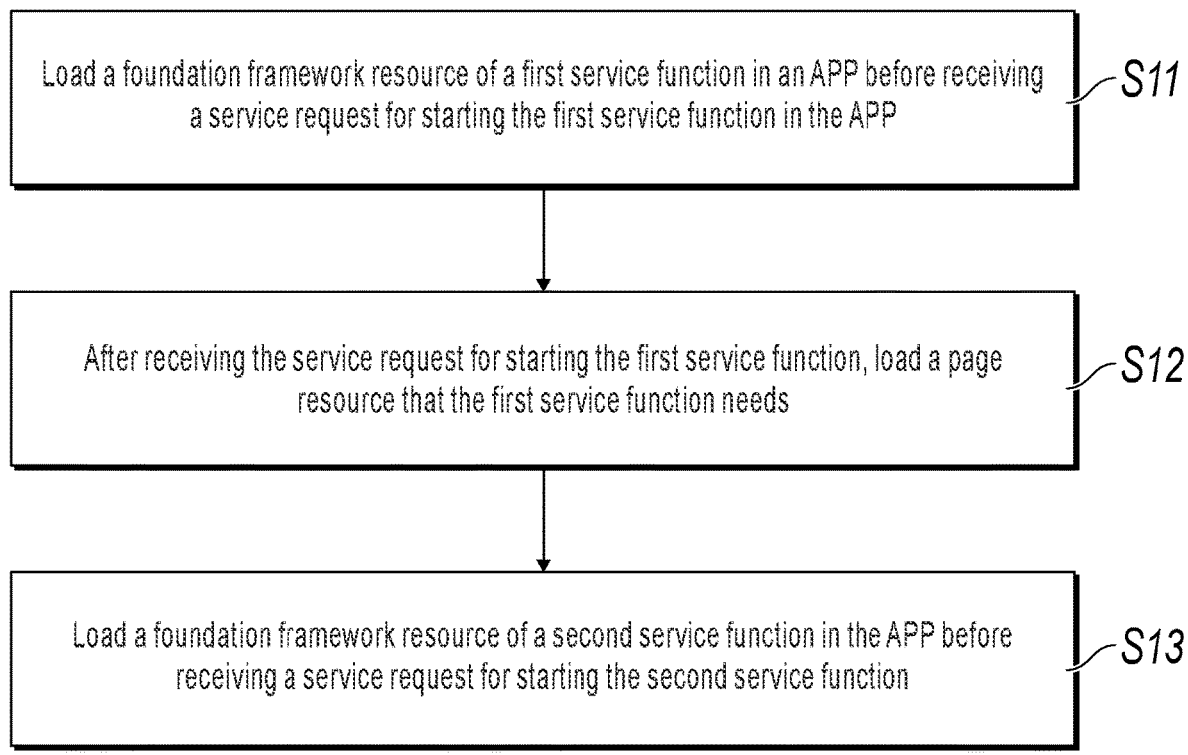
FIG. 1 is a schematic flowchart illustrating implementation of a resource loading method for an APP, according to Implementation 1 of the present application.

As mentioned in the previous description, in daily life, users can usually process various matters by using applications (APPs) installed on terminal devices such as mobile phones and tablets. Various APPs can be used to process different types of matters. For example, commonly used APPs include cab hailing APPs, shopping APPs, electronic payment APPs, instant messaging APPs, etc. An APP usually includes a plurality of service functions. Each service function is used to complete a corresponding sub-service in the APP. For example, an electronic payment APP usually includes a service function for viewing an account balance, a service function for determining a user's personal credit, a service function for viewing historical bills, etc. Corresponding sub-services can be completed by using these service functions.

In current technology, when an APP is running, and a user needs to start a certain service function, the user can trigger the service function (for example, using a start button), and a terminal device (or an operating system) running the APP can load various service resources needed for starting the service function. These service resources usually include a page resource (including page code, etc.) of a page to be displayed and a foundation framework resource that provides a running environment for implementing the service function. For example, when a user triggers a service function for adding friends in an instant messaging APP, the APP can feed back a friend search page to the user. In this case, service resources that need to be loaded include a page code resource of the friend search page and a foundation framework resource needed for implementing the service function.

In actual applications, although the resource loading method is common, it cannot satisfy user needs in some scenarios with real-time performance requirements. For example, for a financial planning APP, users usually pay close attention to changes in account funds. In this case, if the account balance is queried in real time by using a corresponding service function in the APP, and a terminal device running the APP is loading service resources, the service function cannot be implemented in real time because many service resources need to be loaded. As a result, user experience can be negatively affected.

In the present disclosure and to resolve this problem, foundation framework resources are loaded in advance and used to provide running environments in service resources needed for running the service functions. Therefore, compared with current technology, in the present disclosure, after users trigger start buttons of the service functions, fewer resources need to be loaded, and starting of the service functions can be accelerated.

To make the objectives, technical solutions, and advantages of the present application clearer, the following disclosure describes the technical solutions of the present application with reference to the implementations of the present application and the corresponding accompanying drawings. The described implementations are merely some, rather than all, of possible implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Implementation 1

Implementation 1 provides a resource loading method for an APP. Resources of the APP include a foundation framework resource and a page resource. The method is used to resolve the following problem in current technology: Starting a service function takes a long time after a user triggers a start button of the service function. FIG. 1 shows a schematic flowchart of the method, including the following steps:

Step S11: Load a foundation framework resource of a first service function in an APP before receiving a service request for starting the first service function in the APP.

Resources of the APP include a foundation framework resource and a page resource.

Here, the foundation framework resource of the first service function is used to provide a running environment for implementing the first service function. In actual applications, the APP usually has a plurality of service functions. These service functions are usually implemented based on respective running environments. These running environments are usually provided by respective foundation framework resources. The foundation framework resources can include a plurality of instruction sets, data stacks, etc. It is worthwhile to note that, in actual applications, the plurality of service functions in the APP can also be implemented based on the same running environment. In other words, these service functions can correspond to the same foundation framework resource. Alternatively, service function A of the APP can be implemented based on running environment A, and service function B of the APP can be implemented based on running environment B. In other words, service function A of the APP corresponds to a foundation framework resource, and service function B of the APP corresponds to another foundation framework resource.

Further, the foundation framework resource of the first service function in the APP is loaded before the service request for starting the first service function in the APP is received. In other words, the foundation framework resource of the first service function in the APP has been loaded when the service request for starting the first service function in the APP is received. In practice, the foundation framework resource of the first service function in the APP can usually be loaded when the APP is started. Alternatively, the foundation framework resource of the first service function in the APP can be loaded at a specified time point (for example, 9:00 a.m. or 10:00 a.m.). The foundation framework resource of the first service function in the APP can even be loaded, based on a user's habit of using the APP, before the user starts the first service function in the APP. A time point of loading is not limited here, provided that the foundation framework resource of the first service function in the APP is loaded before the service request for starting the first service function in the APP is received.

Step S12: After receiving the service request for starting the first service function, load a page resource that the first service function needs.

Starting a service function usually further needs a corresponding page resource. The terminal device can usually display a page for the first service function to the user after the user triggers the first service function. Therefore, a page resource corresponding to the page is needed. The page resource can include page code, page scripts, etc.

For example, in an instant messaging APP, a friend search page is displayed to the user when the user uses a service function for adding friends to add a friend. Therefore, a page resource related to the search page is needed when the service function is started. The page resource includes page code, texts, images, scripts, etc.

In the present step, the page resource needed for starting the first service function is loaded after the service request for starting the first service function is received, to provide a basis for starting the first service function.

According to step S11 and step S12 in Implementation 1 of the present application, the foundation framework resource of the first service function in the APP is loaded before the service request for starting the first service function in the APP is received, so service resources that need to be loaded are reduced after the service request for stating the first service function in the APP is received. As such, the following problem in current technology is resolved: After a user triggers a start button of a first service function, starting the first service function needs to take a long time because many service resources need to be loaded. Moreover, the user experience is improved.

In addition, in actual applications, an APP provides a plurality of service functions. Therefore, the user can usually use another service function at the same time when using a certain service function. For example, when using an electronic payment APP to view an account balance, a user usually further checks historical bills. Therefore, a service function for checking historical bills also needs to be quickly started in this case. To resolve the problem, a foundation framework resource corresponding to a second service function can be loaded after the page resource that the first service function needs is loaded. As such, step S13 in the present implementation is formed.

Step S13: Load a foundation framework resource of a second service function in the APP before receiving a service request for starting the second service function.

The first service function can be started by using the loaded foundation framework resource and page resource after the page resource needed for starting the first service function is loaded. In this case, the foundation framework resource of the second service function can be loaded to prepare to start the second service function. The second service function is a service function other than the first service function.

It is worthwhile to note that implementation of the first service function relies on the loaded foundation framework resource and page resource of the first service function rather than the foundation framework resource of the second service function. Therefore, after the page resource is loaded, loading the foundation framework resource of the second service function does not affect starting of the first service function. As such, the foundation framework resource of the second service function can be loaded after the first service function is started, or can be loaded directly after the page resource is loaded.

Further, in actual applications, various service functions of the APP can usually be implemented based on the same running environment. In other words, various service functions of the APP correspond to the same foundation framework resource. In this case, after the page resource of the first service function is loaded, the foundation framework resource of the first service function needs to be reloaded before the service request for starting the second service function in the APP is received.

According to step S13, the foundation framework resource of the second service resource is loaded before the service request for starting the second service function in the APP is received. As such, when the second service function is being started, resources that need to be loaded are reduced, and starting of the second service function is accelerated.

It is worthwhile to note that the steps of the method provided in Implementation 1 can be performed by the same device or different devices. For example, step S11 and step S12 can be performed by device 1. For another example, step S11 can be performed by device 1, and step S12 can be performed by device 2.

Figure 2:
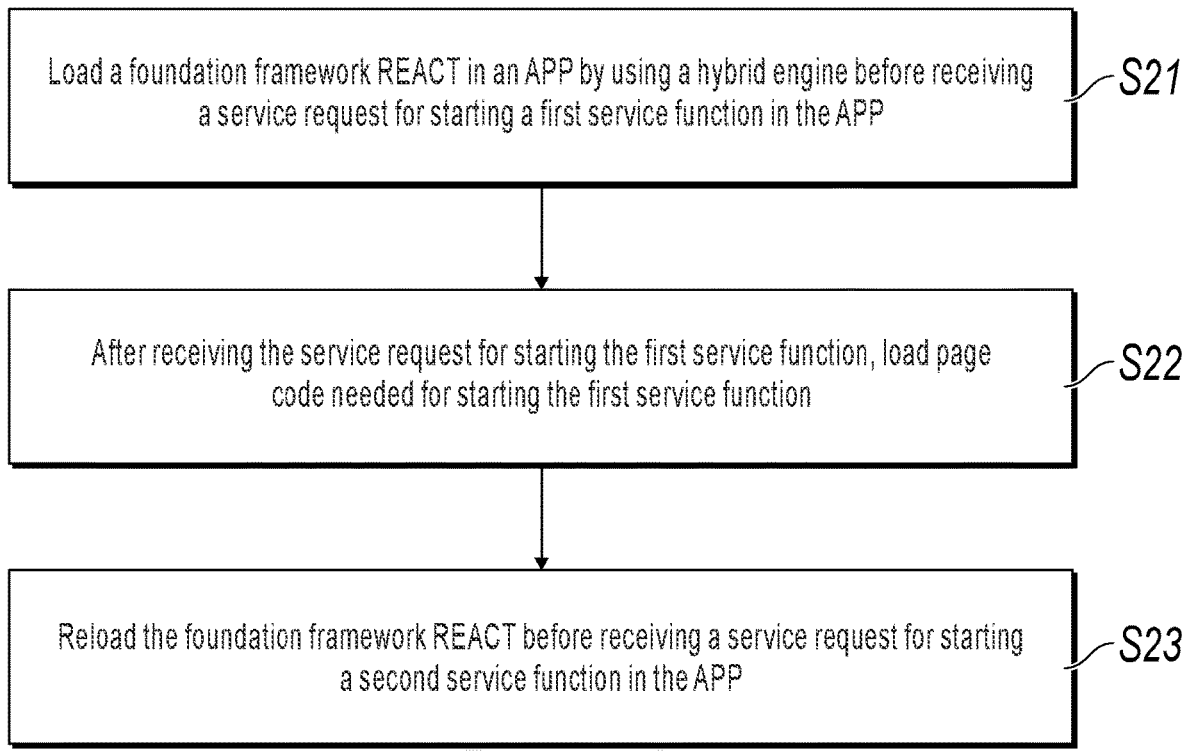
FIG. 2 is a schematic flowchart illustrating implementation of a resource loading method in an application scenario, according to Implementation 1 of the present application.

The resource loading method for an APP provided in the implementation of the present application is described above. For ease of understanding, an implementation of the present application further provides a description of the method implemented in an actual application scenario. As shown in FIG. 2, in the application scenario, the APP is an APP developed based on a combination of native and front-end technologies (referred to as hybrid APP below). An engine of the hybrid APP is usually a hybrid engine. Both the foundation framework resource of the first service function and the foundation framework resource of the second service function are a foundation framework REACT. The foundation framework REACT is a set of hybrid technical solutions launched by Facebook based on a REACT specification. The REACT specification is a scripting language (JavaScript, JS) developed by Facebook for standardizing front-end development. The page resource is mainly page code.

Step S21: Load a foundation framework REACT in an APP by using a hybrid engine before receiving a service request for starting a first service function in the APP.

Here, the APP is a hybrid APP. An engine of the hybrid APP is a hybrid engine. The hybrid engine is used to parse a front-end language and covert the language into native logic code during native and front-end hybrid development. In actual applications, there are many types of hybrid engines. For example, a commonly used hybrid engine is a bridge engine.

In actual applications, after loading the foundation framework REACT, the method can further include hybrid engine initialization.

Step S22: After receiving the service request for starting the first service function, load page code needed for starting the first service function.

In actual applications, the number of bytes occupied by the foundation framework REACT is usually greater than the number of bytes occupied by the page code. For example, if all service resources needed for starting the first service function occupy 100 KB, the page code usually occupies less than 5 KB. Therefore, loading the foundation framework REACT before an instruction for starting the first service function is received can greatly reduce resources that need to be loaded after the instruction for starting the first service function is received, and shorten a time period for starting the first service function.

After loading the page code, the method can further include execution of the loaded page code.

Step S23: Reload the foundation framework REACT before receiving a service request for starting a second service function in the APP.

Figure 3:
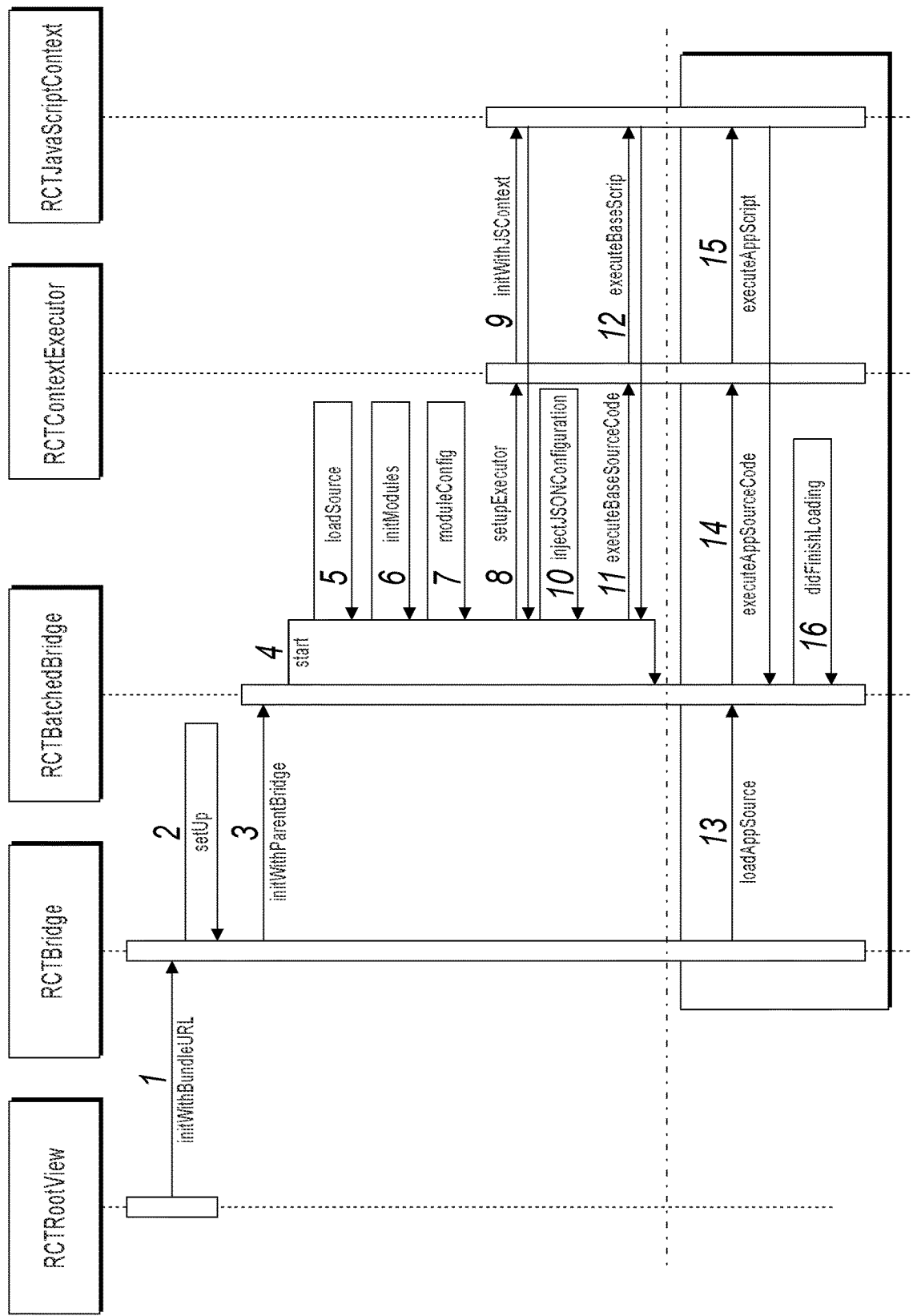
FIG. 3 is a logical sequence diagram illustrating implementation of a resource loading method in an application scenario, according to Implementation 1 of the present application.
Figure 4:
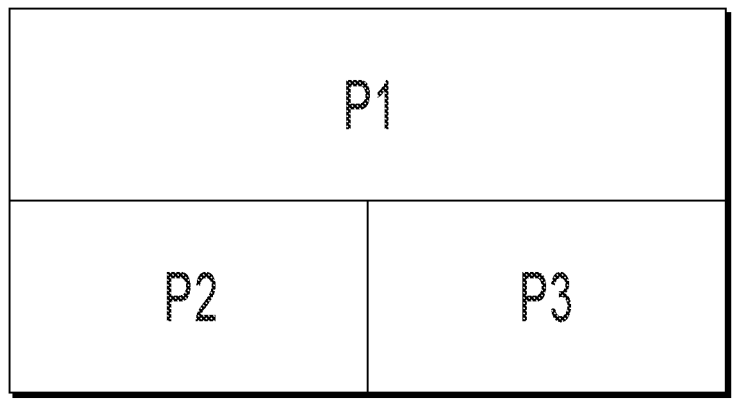
FIG. 4 is a diagram illustrating serial and parallel relationships between three phases in implementation of a resource loading method, according to Implementation 1 of the present application.

Integrate step S21 to step S23 with reference to a logical sequence diagram of a service function in FIG. 3 and a diagram illustrating serial and parallel relationships between three phases in implementation of the method in FIG. 4. In FIG. 4, a process of starting a service function in a hybrid APP is divided into three phases. In the first phase (P1 in FIG. 4), a hybrid engine loads a foundation framework REACT corresponding to a first service function before a service request for starting the first service function is received. In the phase, the hybrid engine can be further initialized. In the second phase (P2 in FIG. 4), after the service request for starting the first service function is received, page code corresponding to the first service function is loaded and executed. In the third phase (P3 in FIG. 4), a new hybrid engine instance loads the foundation framework REACT. In the three phases, the first phase and the second phase can be executed in serial, and the second phase and the third phase can be executed in parallel. Such execution method can usually be referred to as a "double-engine" mode.

Implementation 2

Figure 5:
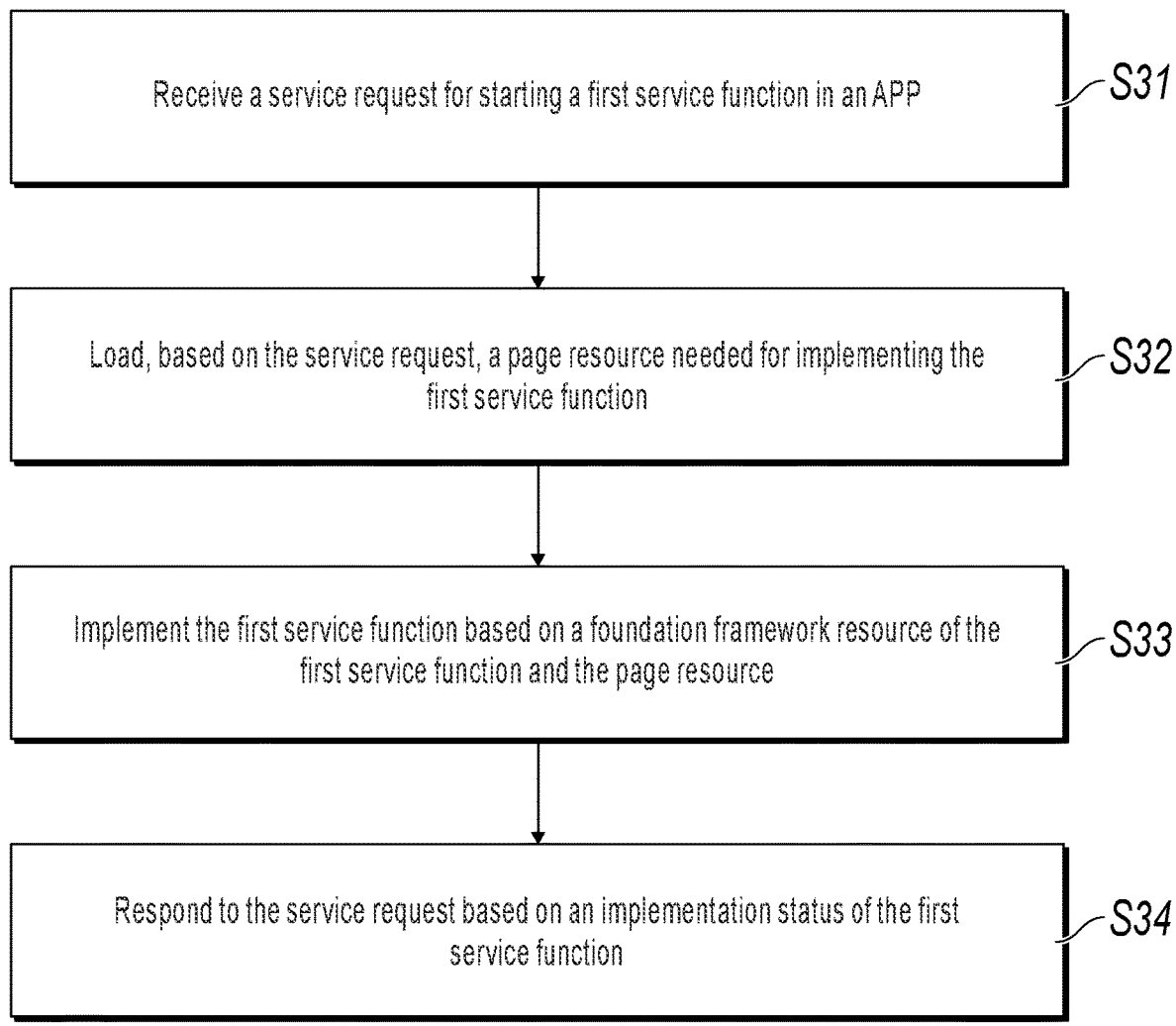
FIG. 5 is a schematic flowchart illustrating implementation of a service function implementing method for an APP, according to Implementation 2 of the present application.

Implementation 2 provides a service function implementing method for an APP to resolve the following problem in current technology: Starting a service function takes a long time after a user triggers a start button of the service function. FIG. 5 shows a schematic flowchart of the method, including the following steps:

S31: Receive a service request for starting a first service function in an APP.

Here, the first service function may be any one of service functions included in the corresponding APP. For example, an online shopping APP can usually include a search service function, an order service function, etc. In the APP, the first service function can be either of the search service function and the order service function.

A user usually installs the APP on terminal devices such as a smartphone, a tablet, and a smart TV. In actual applications, when the user triggers a start button of the first service function, the terminal device can receive a service request for starting the first service function. There are various types of terminal devices, and starting methods in the same terminal device may vary. Therefore, the user can trigger the start button of the first service function by using a plurality of methods, for example, using a mouse to click the start button of the first service function, and/or tapping a touchscreen button of the first service function, and/or triggering the first service function through shaking, gesture recognition, or facial expression recognition. A method for starting the first service function in the APP is not limited here.

S32: Load, based on the service request, a page resource needed for implementing the first service function.

The page resource needed for implementing the first service function is loaded after the service request for starting the first service function in the APP is received.

S33: Implement the first service function based on a foundation framework resource of the first service function and the page resource.

In actual applications, after the page resource is loaded, the page resource can be invoked in a running environment provided by the foundation framework resource, to implement the first service function. The foundation framework resource of the first service function has been loaded based on the method in Implementation 1 before the service request is received. The foundation framework resource of the first service function is used to provide the running environment for implementing the first service function.

The foundation framework resource is started after the page resource is invoked. However, in some cases, for example, when the page resource fails, the page resource usually fails to be invoked. In actual applications, the first service function is usually started after the page resource is invoked successfully.

According to the service processing method provided in Implementation 2 of the present application, the page resource is loaded after the service request for starting the first service function in the APP is received. The first service function is implemented based on the foundation framework resource of the first service function and the page resource.

The foundation framework resource of the first service function has been loaded based on the method in Implementation 1 before the service request is received. Therefore, compared with current technology, in the present application, after the service request is received, fewer resources need to be loaded for starting the first service function, and starting the first service function takes a shorter time.

In actual applications, the service function implementing method for an APP can further include step S34.

S34: Respond to the service request based on an implementation status of the first service function.

A page that needs to be displayed for the first service function is displayed to the user after the first service function is implemented. However, in actual applications, a certain service function may fail to be implemented. For example, a friend search service fails due to a failure in network connection. In this case, a page corresponding to a type of the failure can usually be returned to the user. In other words, when the first service function fails to be implemented, a page for prompting the failure in starting the first service function can be returned to the user. According to step S34, corresponding information is returned to the user based on the implementation status of the first service function, thereby further improving the user experience.

It is worthwhile to note that the steps of the method provided in Implementation 2 can be performed by the same device or different devices. For example, step S31 and step S32 can be performed by device 1. For another example, step S31 can be performed by device 1, and step S32 can be performed by device 2.

Implementation 3

Figure 6:
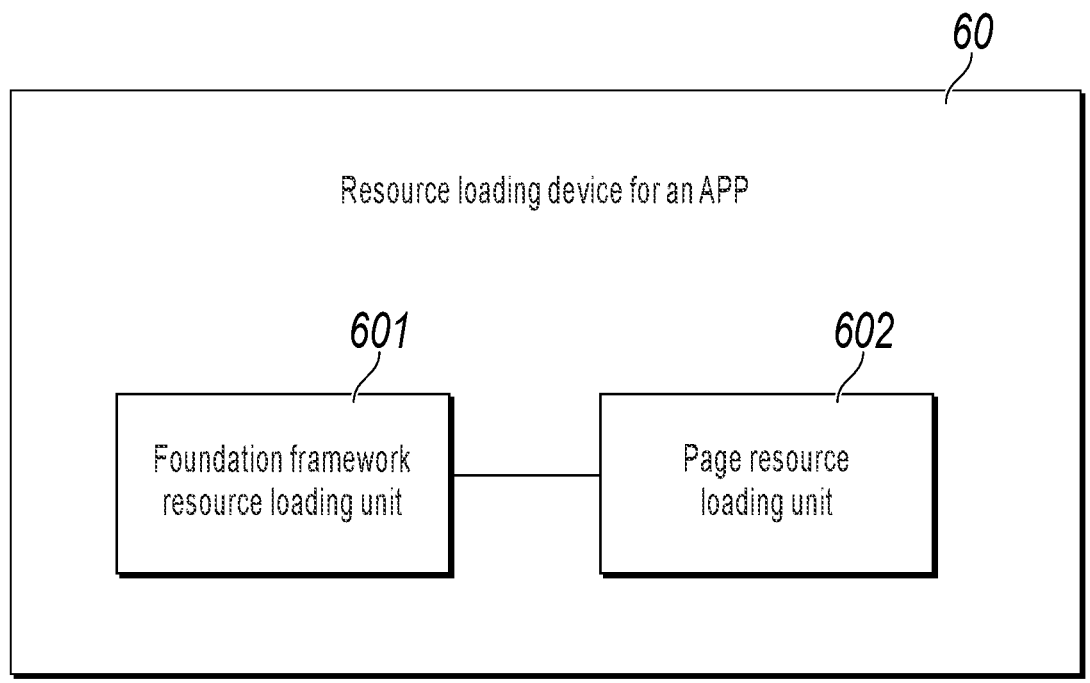
FIG. 6 is a schematic structural diagram illustrating a resource loading device for an APP, according to Implementation 3 of the present application.

Based on the same inventive concept as Implementation 1, Implementation 3 provides a resource loading device for an APP. Resources of the APP include a foundation framework resource and a page resource. As shown in FIG. 6, the device 60 includes a foundation framework resource loading unit 601 and a page resource loading unit 602.

The foundation framework resource loading unit 601 is configured to load a foundation framework resource of a first service function in the APP before a service request for starting the first service function in the APP is received, where the foundation framework resource of the first service function is used to provide a running environment for implementing the first service function.

The page resource loading unit 602 is configured to load a page resource that the first service function needs after the service request for starting the first service function is received.

Because the inventive concept of the device is the same as the inventive concept of Implementation 1, adopting the device provided in Implementation 3 can achieve the same implementation effect as Implementation 1. In addition, in actual applications, the device can further achieve other implementation effects in combination with an actual hardware device. For example, if the hardware device has small memory, phenomena such as unresponsiveness can occur because many resources need to be simultaneously loaded in current technology. According to the device in Implementation 3, unresponsiveness can be reduced because fewer resources are loaded after the start button is triggered.

Preferably, the device 60 can further include a second foundation framework resource loading unit 603, configured to load a foundation framework resource of a second service function in the APP before a service request for starting the second service function is received. In actual applications, after the first service function is started based on the foundation framework resource and the page resource, the foundation framework resource of the second service function can be loaded in advance to prepare to start the second service function. As such, starting of the second service function is accelerated.

Preferably, the foundation framework resource loading unit 601 includes a foundation framework resource loading subunit 6011, configured to load a foundation framework REACT of the first service function in the APP by using a hybrid engine when an engine of the APP is the hybrid engine. In actual applications, when the engine of the APP is a hybrid engine, the foundation framework REACT can be loaded by using the hybrid engine.

Implementation 4

Figure 7:
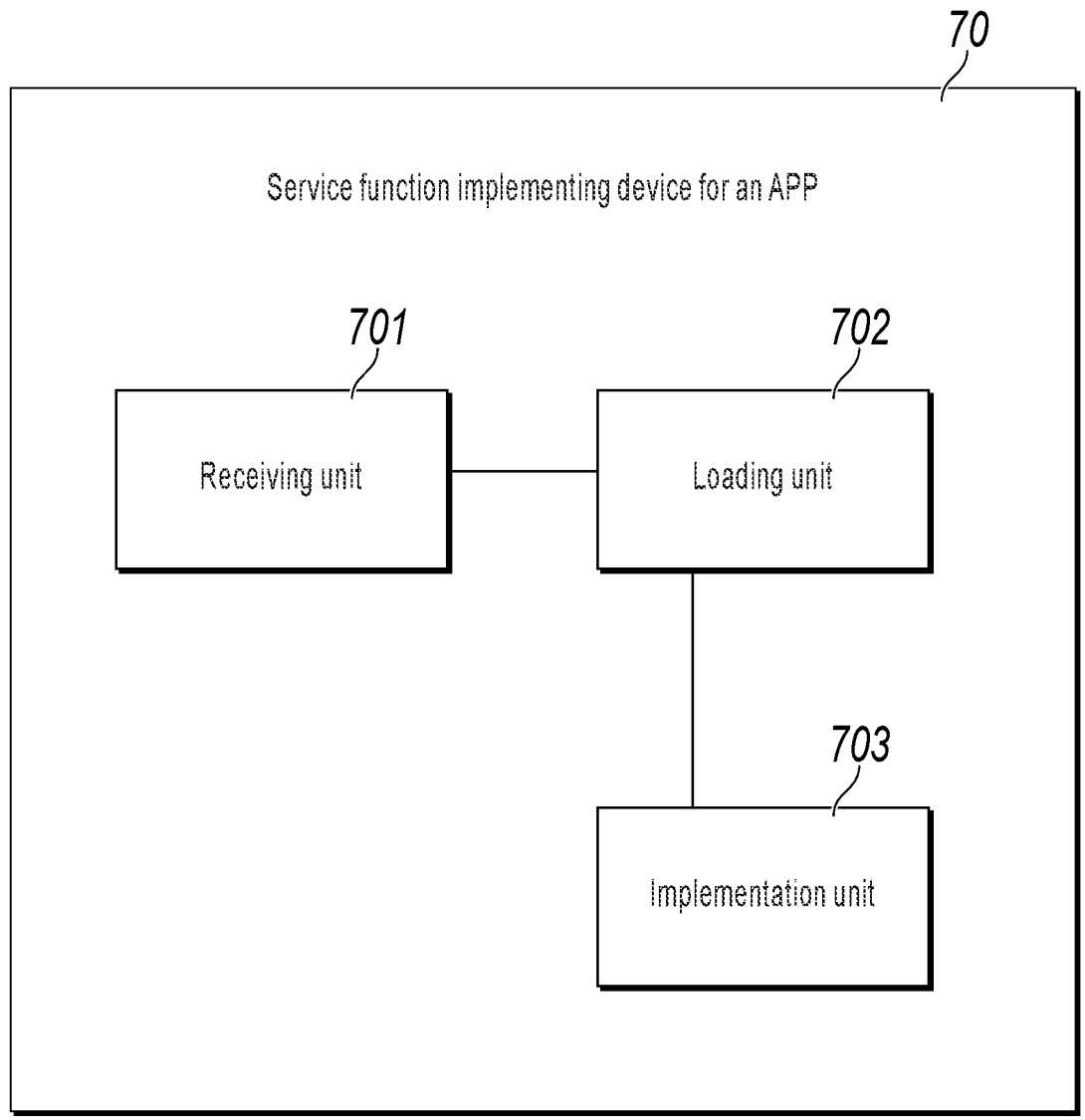
FIG. 7 is a schematic structural diagram illustrating a service function implementing device for an APP, according to Implementation 4 of the present application.

Based on the same inventive concept of Implementation 2, Implementation 4 provides a service function implementing device for an APP. As shown in FIG. 7, the device 70 includes a receiving unit 701, a loading unit 702, and an implementation unit 703.

The receiving unit 701 is configured to receive a service request for starting a first service function in the APP.

The loading unit 702 is configured to load, based on the service request, a page resource needed for implementing the first service function.

The implementation unit 703 is configured to implement the first service function based on a foundation framework resource of the first service function and the page resource, where the foundation framework resource of the first service function is loaded based on the resource loading device for an APP provided in the implementation of the present application before the service request is received.

According to the device provided in Implementation 4 of the present application, when an invoking unit invokes the loaded page resource in an implementation environment provided by the foundation framework resource, the foundation framework resource has been loaded before the receiving unit receives the service request. Therefore, compared with current technology, in the present application, after the service request is received, fewer resources need to be loaded for starting the first service function, and starting the first service function takes a shorter time.

In actual applications, the device 70 can further include a response unit 704, configured to respond to the service request based on a starting status of the first service function. The response unit 704 returns corresponding information to a user based on an implementation status of the first service function, thereby further improving the user experience.

A person skilled in the art should understand that the implementations of the present application can be provided as a method, a system, or a computer program product. Therefore, the present application can use hardware only implementations, software only implementations, or implementations with a combination of software and hardware. Moreover, the present application can use a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the device (system), and the computer program product according to the implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so the instructions executed by a computer or a processor of any other programmable data processing device generate a device for implementing a certain function in one or more processes in the flowcharts and/or in one or more blocks in the block diagrams.

These computer program instructions can be stored in a computer readable memory that can instruct the computer or any other programmable data processing device to work in a specific manner, so the instructions stored in the computer readable memory generate an artifact that includes an instruction device. The instruction device implements a specific function in one or more processes in the flowcharts and/or in one or more blocks in the block diagrams.

These computer program instructions can be loaded to a computer or another programmable data processing device, so a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more central processing units (CPUs), an input/output interface, a network interface, and a memory.

The memory can take a form of a volatile memory, a random access memory (RAM), and/or a non-volatile memory in a computer readable medium, such as a read-only memory (ROM) or a flash RAM. The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that the computing device can access. As defined in the present specification, the computer readable medium does not include transitory media such as a modulated data signal and carrier.

Moreover, it is worthwhile to note that the terms "include", "comprise", or their any other variants are intended to cover a non-exclusive inclusion, so a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use hardware only implementations, software only implementations, or implementations with a combination of software and hardware. Moreover, the present application can use a computer program product that is implemented on one or more computer-usable storage media (including but not limited to a disk memory, a CD-ROM, an optical memory, etc.) that include computer-usable program code.

The above-mentioned descriptions are merely the implementations of the present application, but are not intended to limit the present application. A person skilled in the art can make various modifications and variations to the present application. Any modification, equivalent replacement, or improvement made without departing from the spirit and principle of the present application shall fall within the scope of the claims of the present application.

Figure 8:
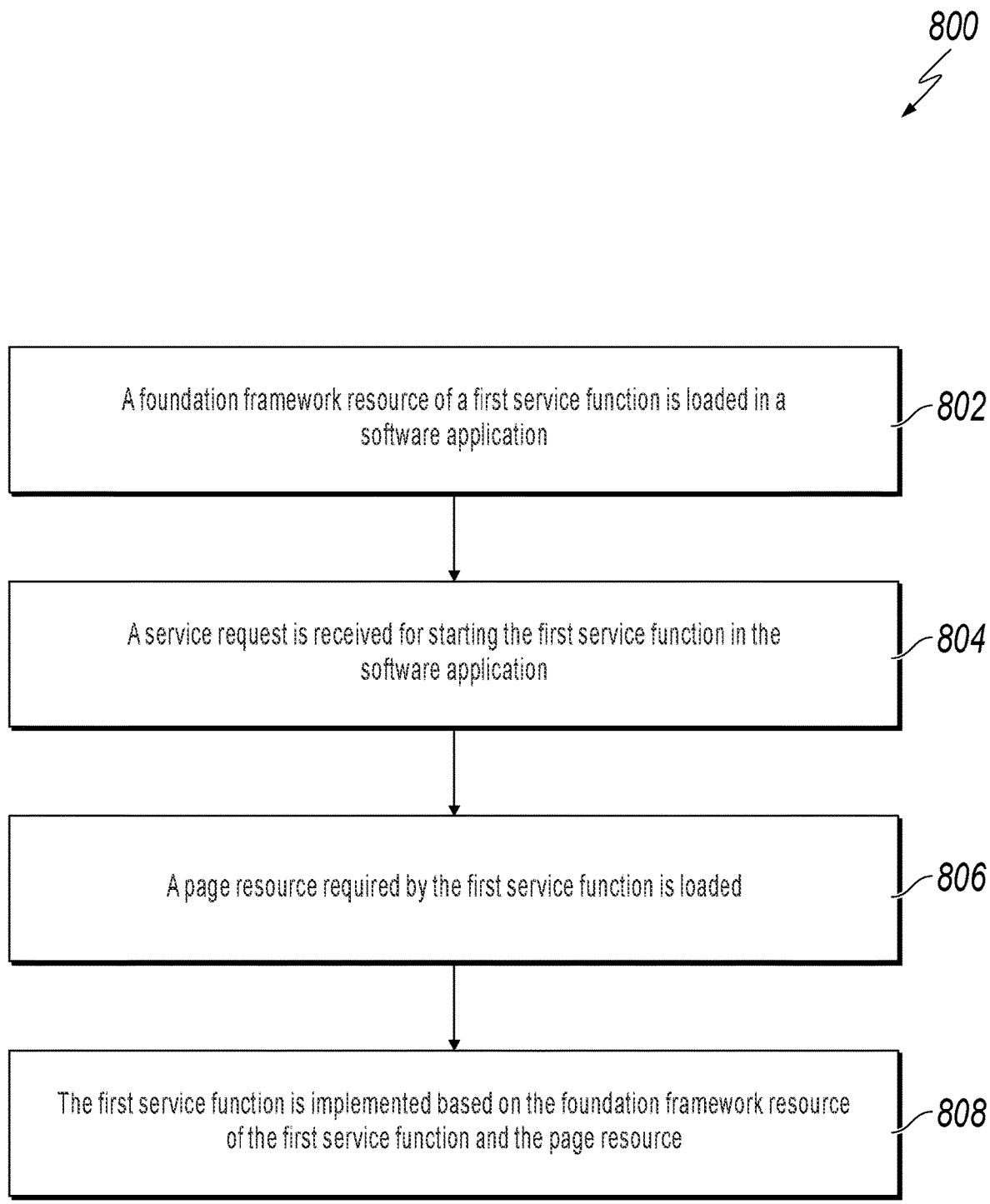
FIG. 8 is a flowchart illustrating an example of a computer-implemented method for providing resource loading and a service function for an application, according to an implementation of the present disclosure.

FIG. 8 is a flowchart illustrating an example of a computer-implemented method 800 for providing resource loading and a service function for an application, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a foundation framework resource of a first service function is loaded in a software application. In some implementations, resources of the software application comprise a foundation framework resource and a page resource. In some implementations, the foundation framework resource of the first service function is used to provide a running environment for implementing the first service function. In some implementations, an engine of the software application is a hybrid engine and the hybrid engine loads the foundation framework resource of the first service function in the software application. From 802, method 800 proceeds to 804.

At 804, a service request is received for starting the first service function in the software application. From 804, method 800 proceeds to 806.

At 806, a page resource required by the first service function is loaded. In some implementations, method 800 further comprises, after loading the page resource required by the first service function, a foundation framework resource of a second service function is loaded in the software application before receiving a service request for starting the second service function. In some implementations, loading the page resource required by the first service function is based on the service request. In some implementations, the foundation framework resource of the first service function is loaded before the service request for starting the first service function in the software application is received. From 806, method 800 proceeds to 808.

At 808, the first service function is implemented based on the foundation framework resource of the first service function and the page resource. After 808, method 800 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    loading a foundation framework resource of a first service function in a software application, wherein the software application provide a plurality of service functions, the plurality of service functions comprise the first service function and a second service function;
    receiving a service request for starting the first service function in the software application;
    loading a page resource required by the first service function;
    implementing the first service function based on the foundation framework resource of the first service function and the page resource;
    displaying a page corresponding to the first service function after implementing the first service function;
    receiving a second service request for starting the second service function;
    loading a second page resource required by the second service function; and
    implementing the second service function based on a second foundation framework resource of the second service function and the second page resource.

2. The computer-implemented method of claim 1, wherein the software application is an electronic payment application.

3. The computer-implemented method of claim 1, wherein the foundation framework resource of the first service function is used to provide a running environment for implementing the first service function.

4. The computer-implemented method of claim 1, wherein the second foundation framework resource of the second service function is the same as the foundation framework resource of the first service function.

5. The computer-implemented method of claim 1, wherein the foundation framework resource of the first service function is loaded before the service request for starting the first service function in the software application is received.

6. A non-transitory, computer-readable medium storing one or more instructions executable by a computer system to perform operations comprising:
    loading a foundation framework resource of a first service function in a software application, wherein the software application provide a plurality of service functions, the plurality of service functions comprise the first service function and a second service function;
    receiving a service request for starting the first service function in the software application;
    loading a page resource required by the first service function;
    implementing the first service function based on the foundation framework resource of the first service function and the page resource;
    displaying a page corresponding to the first service function after implementing the first service function;
    receiving a second service request for starting the second service function;
    loading a second page resource required by the second service function; and
    implementing the second service function based on a second foundation framework resource of the second service function and the second page resource.

7. The non-transitory, computer-readable medium of claim 6, wherein the software application is an electronic payment application.

8. The non-transitory, computer-readable medium of claim 6, wherein the foundation framework resource of the first service function is used to provide a running environment for implementing the first service function.

9. The non-transitory, computer-readable medium of claim 6, wherein the second foundation framework resource of the second service function is the same as the foundation framework resource of the first service function.

10. The non-transitory, computer-readable medium of claim 6, wherein the foundation framework resource of the first service function is loaded before the service request for starting the first service function in the software application is received.

11. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    loading a foundation framework resource of a first service function in a software application, wherein the software application provide a plurality of service functions, the plurality of service functions comprise the first service function and a second service function;
    receiving a service request for starting the first service function in the software application;
    loading a page resource required by the first service function;
    implementing the first service function based on the foundation framework resource of the first service function and the page resource;
    displaying a page corresponding to the first service function after implementing the first service function;
    receiving a second service request for starting the second service function;
    loading a second page resource required by the second service function; and
    implementing the second service function based on a second foundation framework resource of the second service function and the second page resource.

12. The computer-implemented system of claim 11, wherein the software application is an electronic payment application.

13. The computer-implemented system of claim 11, wherein the foundation framework resource of the first service function is used to provide a running environment for implementing the first service function.

14. The computer-implemented system of claim 11, wherein the second foundation framework resource of the second service function is the same as the foundation framework resource of the first service function.

* * * * *